United States Patent
Shimazoe

(10) Patent No.: US 11,491,579 B2
(45) Date of Patent: Nov. 8, 2022

(54) LASER WELDING METHOD

(71) Applicant: NOK CORPORATION, Tokyo (JP)

(72) Inventor: Toshihiro Shimazoe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 589 days.

(21) Appl. No.: 16/478,594

(22) PCT Filed: Feb. 21, 2018

(86) PCT No.: PCT/JP2018/006162
§ 371 (c)(1),
(2) Date: Jul. 17, 2019

(87) PCT Pub. No.: WO2018/155477
PCT Pub. Date: Aug. 30, 2018

(65) Prior Publication Data
US 2020/0030912 A1   Jan. 30, 2020

(30) Foreign Application Priority Data

Feb. 24, 2017 (JP) .............................. JP2017-032872

(51) Int. Cl.
*B23K 26/082* (2014.01)
*B23K 26/26* (2014.01)
(Continued)

(52) U.S. Cl.
CPC ........... *B23K 26/21* (2015.10); *H01M 8/0202* (2013.01)

(58) Field of Classification Search
CPC ............................ B23K 26/082; B23K 26/244
See application file for complete search history.

(56) References Cited

U.S. PATENT DOCUMENTS 6,646,225 B1* 11/2003 Wang ................. B23K 26/0608
219/121.64
6,906,281 B2* 6/2005 Musselman ............ B23K 26/32
219/137 WM
(Continued)

FOREIGN PATENT DOCUMENTS

CN    102233481 A    11/2011
CN    102528284 A    7/2012
(Continued)

OTHER PUBLICATIONS

The extended European Search Report, European Patent Office, Application No. 18758380.2, dated Feb. 10, 2020.
(Continued)

*Primary Examiner* — Dana Ross
*Assistant Examiner* — Lawrence H Samuels
(74) *Attorney, Agent, or Firm* — Greenblum & Bernstein, P.L.C.

(57) ABSTRACT

This invention provides a laser welding method in which a state where the irradiation energy density becomes excessively high by a plurality of times of irradiation with laser is not caused and a defect, such as a hole, does not occur in a workpiece. In order to achieve the object, a laser welding method for welding a plurality of workpieces by irradiating the workpieces in a stacked state with a laser beam is characterized in that, when the laser beam is reciprocatingly emitted along a fixed welding line, the irradiation positions of a start end A and a termination end A" of the irradiation are shifted away from each other so that the irradiation energy can be dispersed. Moreover, when the laser beam is emitted a plurality of times in the same direction along the fixed welding line, the irradiation positions of the start ends or/and the termination ends of the irradiation are shifted
(Continued)

away from each other so that the irradiation energy can be dispersed.

4 Claims, 9 Drawing Sheets

(51) Int. Cl.
  *B23K 26/21* (2014.01)
  *H01M 8/0202* (2016.01)

(56) References Cited

U.S. PATENT DOCUMENTS

| | | | | |
|---|---|---|---|---|
| 8,263,289 | B2* | 9/2012 | Miyazawa | H01M 8/1004 |
| | | | | 429/514 |
| 8,575,512 | B2* | 11/2013 | Hagihara | B23K 26/244 |
| | | | | 219/121.64 |
| 10,953,494 | B2* | 3/2021 | Yang | B23K 26/322 |
| 2004/0173587 | A1* | 9/2004 | Musselman | B23K 26/244 |
| | | | | 219/137 R |
| 2009/0092872 | A1* | 4/2009 | Miyazawa | H01M 8/0267 |
| | | | | 429/434 |
| 2011/0266263 | A1* | 11/2011 | Hagihara | B23K 26/244 |
| | | | | 219/121.64 |
| 2012/0160815 | A1 | 6/2012 | Hayashimoto et al. | |
| 2012/0211474 | A1* | 8/2012 | Hayashimoto | B23K 26/0665 |
| | | | | 219/121.64 |
| 2014/0190621 | A1* | 7/2014 | Kawata | B23K 26/40 |
| | | | | 156/155 |
| 2014/0377578 | A1* | 12/2014 | Hisada | B23K 26/32 |
| | | | | 428/594 |
| 2016/0193694 | A1* | 7/2016 | Dinkelman | H01M 50/502 |
| | | | | 429/178 |
| 2017/0001261 | A1* | 1/2017 | Fujiwara | B23K 26/244 |
| 2017/0050269 | A1* | 2/2017 | Nakagawa | B23K 26/082 |
| 2017/0106470 | A1* | 4/2017 | Solomon | B23K 26/22 |
| 2017/0232554 | A1* | 8/2017 | Gilloon | B23K 26/244 |
| | | | | 403/270 |
| 2018/0009060 | A1* | 1/2018 | Yang | B23K 26/244 |
| 2018/0221989 | A1* | 8/2018 | Matsuoka | B23K 26/02 |
| 2018/0229332 | A1* | 8/2018 | Tsai | B23K 26/22 |
| 2018/0243861 | A1* | 8/2018 | Wang | B23K 26/322 |
| 2018/0304405 | A1* | 10/2018 | Yang | B23K 26/22 |
| 2020/0114469 | A1* | 4/2020 | Tao | B23K 26/244 |

FOREIGN PATENT DOCUMENTS

| | | |
|---|---|---|
| CN | 105880829 A | 8/2016 |
| CN | 106029291 A | 10/2016 |
| DE | 102010018377 | 4/2011 |
| JP | 2002-172484 | 6/2002 |
| JP | 2005-106527 | 4/2005 |
| JP | 2009-183970 | 8/2009 |
| JP | 2012-135794 | 7/2012 |
| KR | 10-2014-0080754 | 7/2014 |

OTHER PUBLICATIONS

China Official Action received in 201880008741.0, dated Sep. 3, 2020.
International Search Report issued in International Pat. App. No. PCT/JP2018/006162, dated Apr. 17, 2018 (with English translation).
Korean Office Action received in KR Application No. 10-2019-7023103, dated Feb. 21, 2022.

* cited by examiner

LASER WELDING METHOD

TECHNICAL FIELD

The present invention relates to a laser welding method for welding a plurality of workpieces by irradiating the workpieces in a stacked state with a laser beam.

BACKGROUND ART

For example, a technique is known which includes laser welding the outer periphery of an anode separator (first workpiece) 11 and a cathode separator (second workpiece) 12 stacked on each other and the periphery of a manifold 13 (welded portion by the laser welding is denoted by the reference numeral $L_1$) to thereby form a welded seal (welded seal line) 14 in a fuel cell as illustrated in FIGS. 5 and 6. In the plan view of FIG. 5, the welded seal 14 is indicated by the dotted line and a rubber seal (rubber seal line) 16 by a gasket 15 is indicated by the solid line. In the cross-sectional view of FIG. 6, the reference numeral 17 denotes a hydrogen flow passage, the reference numeral 18 denotes an oxygen flow passage, and the reference numeral 19 denotes a cooling water flow passage.

PRIOR ART DOCUMENT

Patent Document

Patent Document 1: Japanese Unexamined Patent Application Publication No. 2009-183970

Moreover, a technique is known which includes laser welding the pair of separators (first and second workpieces) 11 and 12 to thereby form the welded seal 14 and joining an accessory component (third workpiece) 20 to the pair of laser-welded separators 11 and 12 similarly by laser welding (welded portion by the laser welding is denoted by the reference numeral $L_2$) as illustrated in FIGS. 7 and 8. As the accessory component 20, FIGS. 7 and 8 illustrate a voltage monitoring component. However, the type of the component is not particularly limited and components for positioning between separators illustrated in FIG. 9 or the like may be acceptable, for example.

Thus, when the welded seal 14 is formed by laser welding the pair of separators 11 and 12 and the accessory component 20 is joined to the pair of laser-welded separators 11 and 12 similarly by laser welding, the welded portion $L_2$ of the separators 11 and 12 and the accessory component 20 of the latter needs to be welded with an energy density (heat input amount) higher than that of the welded portion $L_1$ between the pair of separators 11 and 12 because a total thickness $t_2$ due to the three components 11, 12, and 20 increases ($t_1 < t_2$ when the thickness due to the pair of separators 11 and 12 is defined as $t_1$). In the welded portion $L_2$ of the separators 11 and 12 and the accessory component 20, the three components 11, 12, and 20 are preferably penetration welded so as to stabilize the quality. However, it is desirable that a hole or the like is not generated in the three components 11, 12, and 20.

As a technique of laser welding the pair of separators 11 and 12 to thereby form the welded seal 14 and joining the accessory component 20 to the pair of laser-welded separators 11 and 12 similarly by laser welding described above, a technique is mentioned which includes successively performing a process of welding the pair of separators 11 and 12 and a process of welding the pair of separators 11 and 12 and the accessory component 20 as separate processes by preparing a plurality of laser irradiation devices different in output.

This is a technique, for example, which includes preparing a 500 W small output irradiation device and a 750 W large output irradiation device (neither is illustrated), and first welding the pair of separators 11 and 12 in the welded portion $L_1$ using the 500 W small output irradiation device as illustrated in FIG. 10(A), and then welding the pair of separators 11 and 12 and the accessory component 20 in the welded portion $L_2$ using the 750 W large output irradiation device as illustrated in FIG. 10(B).

However, this technique causes an increase in the number of processes and an increase in the facility cost, and therefore has a problem leading to a cost increase.

SUMMARY OF INVENTION

Problem to be Solved by the Invention

As a method in which the process of the welding of the accessory component 20 is not separated, the welding of the pair of separators 11 and 12 and the welding of the pair of separators 11 and 12 and the accessory component 20 are performed in the same process using the same laser irradiation device. In the welding of the pair of separators 11 and 12 and the accessory component 20 of the latter, when the welded portion $L_2$ of the accessory component 20 is reciprocatingly irradiated with laser along a fixed welding line to thereby apply an energy density corresponding to an increase in the plate thickness thereto, the three components 11, 12, and 20 can be penetration welded.

Herein, the description "the welded portion $L_2$ of the accessory component 20 is reciprocatingly irradiated with laser along a fixed welding line" means that, when the laser is emitted along the fixed welding line from an A point to a B point in the welded portion $L_2$ of the accessory component 20 as illustrated in FIG. 11, for example, the irradiation is performed from the A point to the B point (arrow a) with the A point as a start end of the irradiation and the irradiation is continuously performed from the B point to the A point (arrow b) by returning at the B point so that the A point is set as a termination end of the irradiation, and thus the irradiation is substantially performed twice (one reciprocation) along the fixed welding line.

However, in this case, each of the start end (start portion) and the termination end (terminal) of the laser irradiation is brought into a state where the energy density (heat input amount) is higher than that in the other portions in many cases due to the machine control or the like, and therefore is brought into a state where the melting amount is large. Accordingly, when the start end and the termination end of the irradiation are set at the same position (A point) while overlapping each other on the plane, a state where the density of the energy to be emitted becomes excessively high is caused, and, as a result, there is a possibility that a defect, such as a hole, occurs.

It is an object of the present invention to provide, in view of the above-described respects, a laser welding method in which a state where the irradiation energy density becomes excessively high by a plurality of times of laser irradiation is not caused and a defect, such as a hole, does not occur in a workpiece.

Means for Solving the Problem

In order to achieve the above-described object, a laser welding method of the present invention is characterized in that, in a laser welding method for welding a plurality of workpieces by irradiating the workpieces in a stacked state with a laser beam, when the laser beam is emitted a plurality of times along a fixed welding line, the irradiation positions of ends of the irradiation are shifted away from each other so that the irradiation energy can be dispersed.

A laser welding method of the present invention is characterized in that, in a laser welding method for welding a plurality of workpieces by irradiating the workpieces in a stacked state with a laser beam, when the laser beam is reciprocatingly emitted along a fixed welding line, the irradiation positions of a start end and a termination end of the irradiation are shifted away from each other so that the irradiation energy can be dispersed.

As an aspect of implementation, first irradiation of emitting a laser beam so as to weld a first workpiece and a second workpiece and second irradiation of emitting a laser beam so as to weld a third workpiece to the first and second workpieces welded by the first irradiation are performed in the same process using the same irradiation device, the laser beam is reciprocatingly emitted along the fixed welding line in performing the second irradiation, and the irradiation positions of the start end and the termination end of the irradiation are shifted away from each other at this time so that the irradiation energy can be dispersed.

A laser welding method of the present invention is characterized in that, in a laser welding method for welding a plurality of workpieces by irradiating the workpieces in a stacked state with a laser beam, when the laser beam is emitted a plurality of times in the same direction along a fixed welding line, the irradiation positions of start ends or/and termination ends of the irradiation are shifted away from each other so that the irradiation energy can be dispersed.

As an aspect of implementation, first irradiation of emitting a laser beam so as to weld a first workpiece and a second workpiece and second irradiation of emitting a laser beam so as to weld a third workpiece to the first and second workpieces welded by the first irradiation are performed in the same process using the same irradiation device, the laser beam is emitted a plurality of times in the same direction along the fixed welding line in performing the second irradiation, and the irradiation positions of the start ends or/and the termination ends of the irradiation are shifted away from each other at this time so that the irradiation energy can be dispersed.

The first and second workpieces are fuel cell separators and the third workpiece is an accessory component attached to the fuel cell separator.

Effect of the Invention

In the present invention, when a laser beam is emitted a plurality of times along a fixed welding line, the irradiation positions of ends of the irradiation are shifted away from each other so that the irradiation energy can be dispersed, and therefore a state where the irradiation energy density becomes excessively high at the ends of the irradiation is not caused. Therefore, the occurrence of a defect, such as a hole, in a workpiece due to the fact that the irradiation energy density becomes excessively high by the plurality of times of laser irradiation can be prevented.

DESCRIPTION OF EMBODIMENTS

The present invention contains the following embodiments.

(1) A separate component (accessory component) is joined by welding to welded separators in which an anode separator and a cathode separator are welded to thereby form a seal line. The welding of the seal line and the welding of the separate component are carried out in the same process (same facility) and, when the separate component is welded to the separators, laser irradiation is performed a plurality of times in the same welding line. It is configured so that the welding lines of a start portion and a termination end of the welding are shifted away from each other when the laser irradiation is performed a plurality of times in the same welding line.

(2) In the case where the welding of the seal line and the welding of the separate component are carried out in the same process (same facility), when the laser irradiation is performed a plurality of times in the same welding line in welding the separate component to the separators, the welding lines of the start portion and the termination end of the laser irradiation are shifted away from each other so as not to be overlapped. This makes it possible to avoid that the density of the energy (heat input amount) to be emitted to the start portion and the termination end become excessive and to take measures against a defect, such as a hole.

(3) According to the present invention, by carrying out the welding of the seal line and the welding of the separate component in the same process, the number of processes decreases and the facility decreases, so that a cost reduction can be expected. By avoiding the concentration of the energy density (heat input amount) in the start portion and the termination end of the welding, a defect of a hole does not occur, so that the quality is stabilized.

EXAMPLES

Next, examples of the present invention are described according to the drawings.

Figure 1:
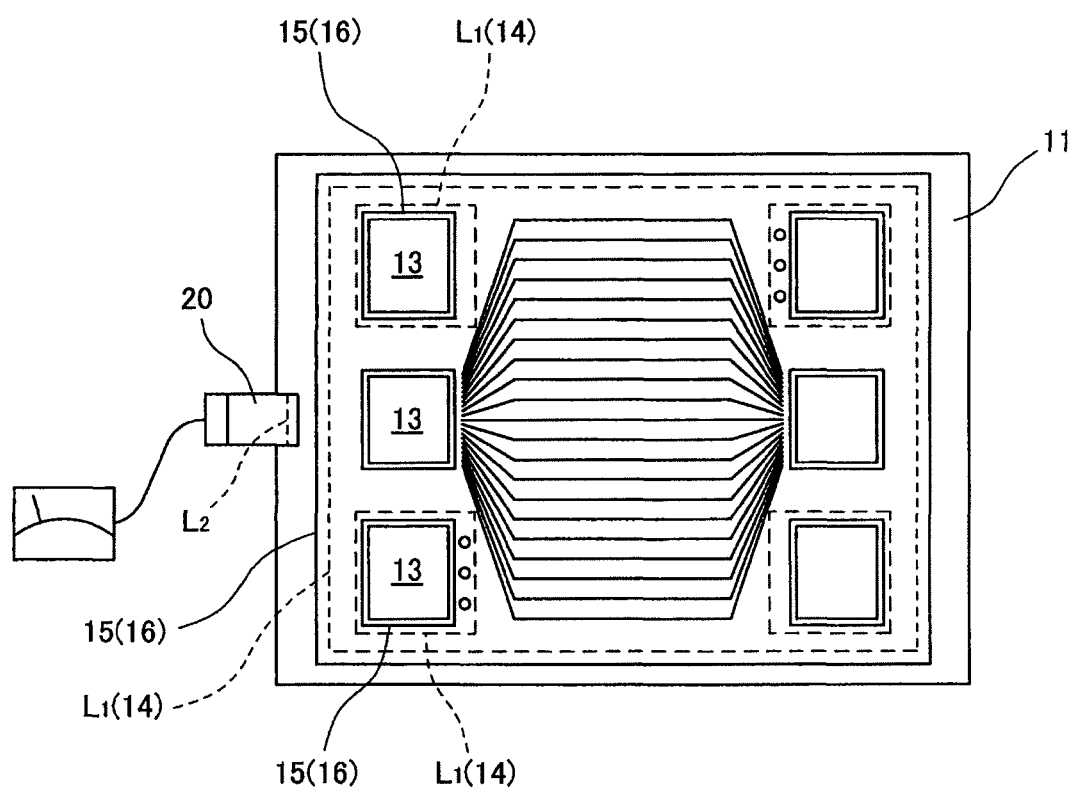
FIG. 1 is a plan view illustrating an example of a fuel cell constituent component serving as a workpiece in a laser welding method according to an example of the present invention.
Figure 9:
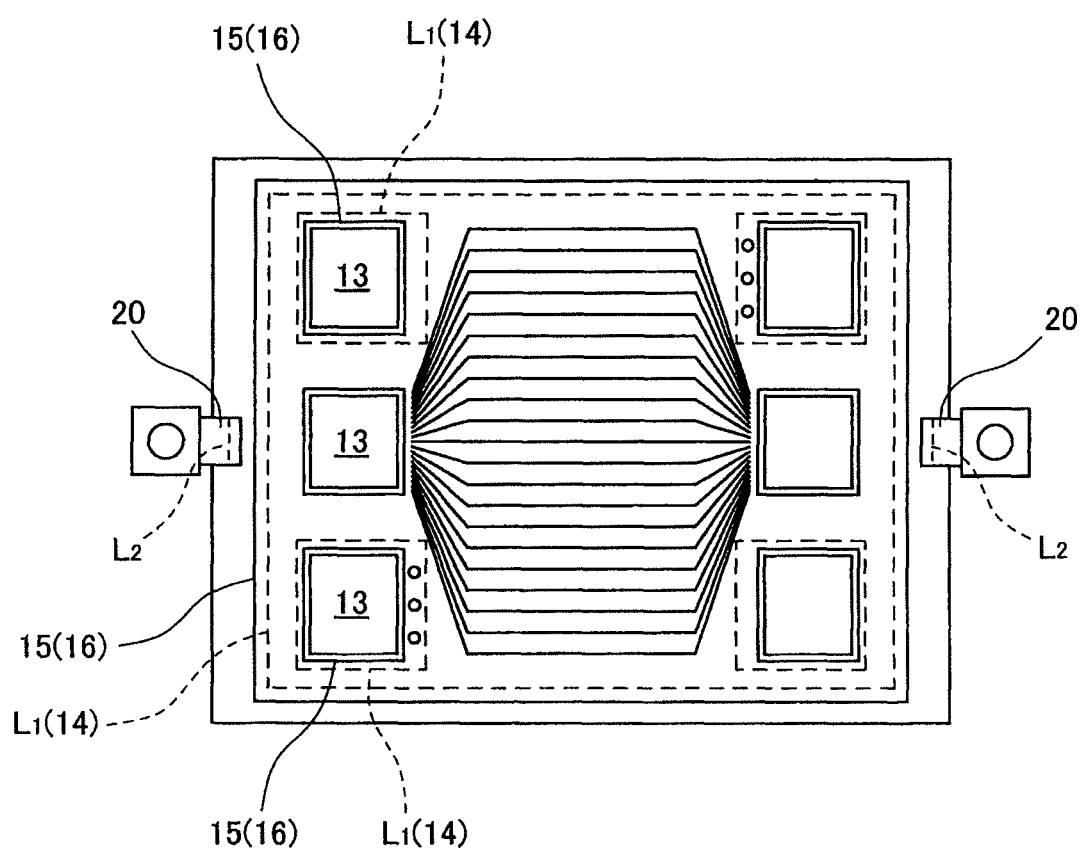
FIG. 9 is a plan view illustrating another example of the fuel cell constituent component serving as a workpiece in the laser welding method according to the conventional example.
Figure 10A:
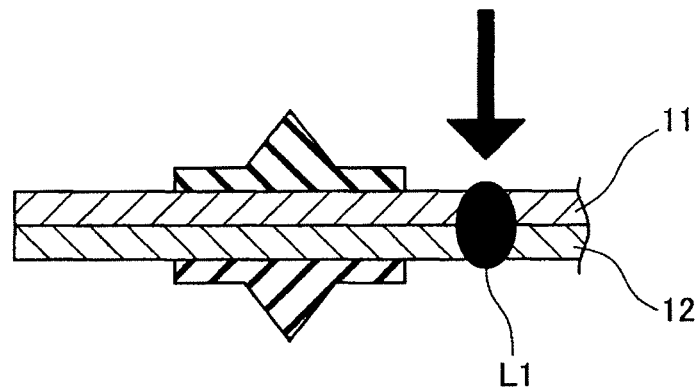
FIGS. 10(A) and 10(B) are process explanatory views of the laser welding method according to the conventional example.
Figure 10B:
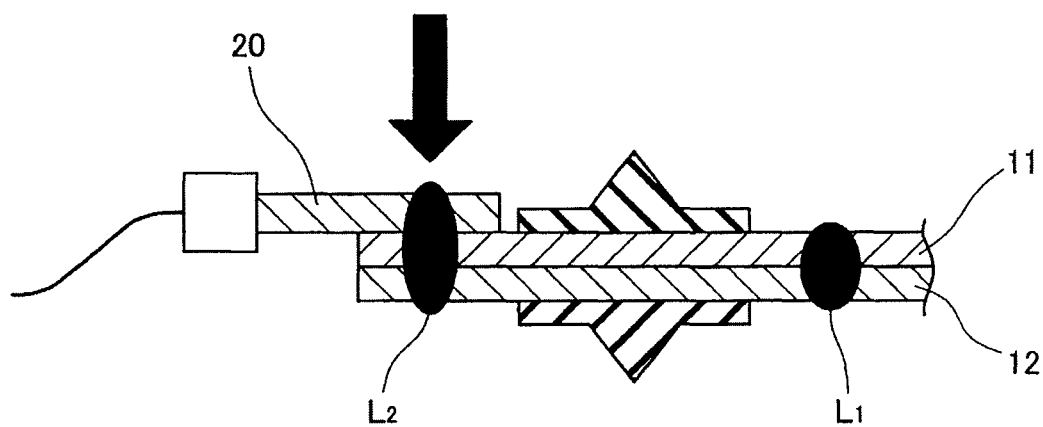
Figure 11:
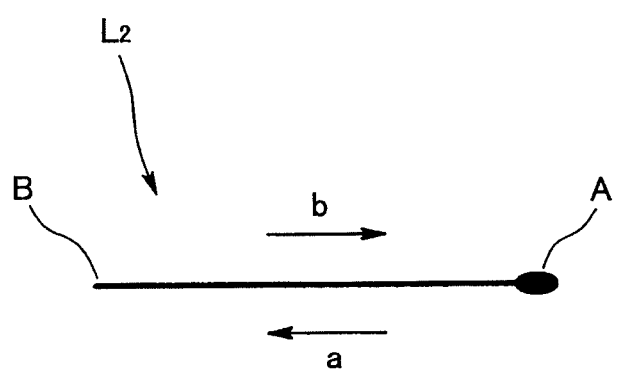
FIG. 11 is an explanatory view of laser irradiation positions in a laser welding method according to another conventional example.

As illustrated in FIGS. 1 and 2, a laser welding method according to this example includes joining a pair of fuel cell separators 11 and 12 as workpieces (welding target) thereof by laser welding, i.e., includes laser welding the outer periphery of the anode separator (first workpiece) 11 and the cathode separator (second workpiece) 12 stacked on each other and the periphery of a manifold 13 (a welded portion by the laser welding is denoted by the reference numeral $L_1$) to thereby form a welded seal (welded seal line) 14 and joining an accessory component (third workpiece) 20 to the pair of laser-welded separators 11 and 12 similarly by performing laser welding (a welded portion by the laser welding is denoted by the reference numeral $L_2$). As the accessory component 20, a voltage monitoring component is illustrated. However, the type of the component is not particularly limited and a component for positioning between separators illustrated in FIG. 9 above or the like may be acceptable, for example. In the plan view of FIG. 1, the welded seal 14 is indicated by the dotted line and the rubber seal (rubber seal line) 16 by the gasket 15 is indicated by the solid line.

Moreover, as a method for not performing the welding of the accessory component 20 and the welding of the separators 11 and 12 in separate processes, the welding of the pair of separators 11 and 12 and the welding of the pair of separators 11 and 12 and the accessory component 20 are performed in the same process using the same laser irradiation device (not illustrated) in the laser welding method according to this example.

The procedure is as follows.

<Welding of Separators 11 and 12>

Figure 2A:
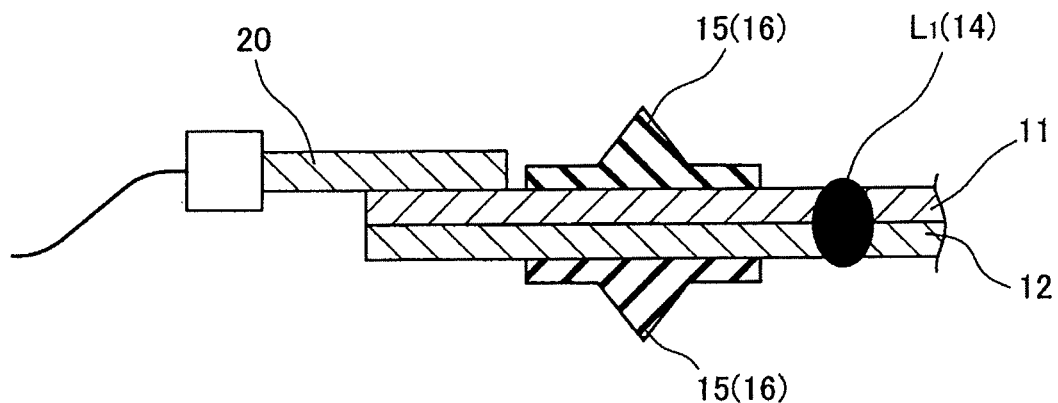
FIGS. 2(A), 2(B), and 2(C) are process explanatory views of the laser welding method.

More specifically, first, the pair of separators 11 and 12 are stacked on each other, and then the separators 11 and 12 are irradiated with a laser beam (first irradiation) to form the welded portion $L_1$, i.e., the welded seal 14, of the separators 11 and 12 as illustrated in FIG. 2(A).

<Welding of Separators 11 and 12 and Accessory Component 20>

Figure 2B:
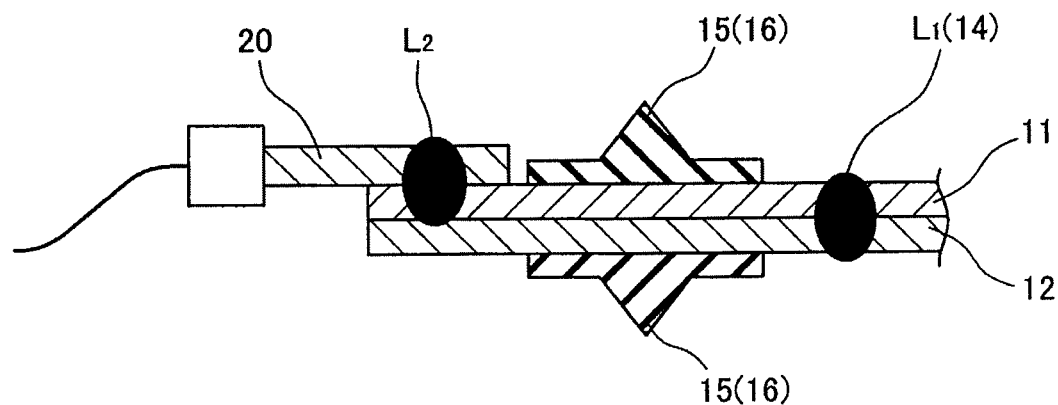
Figure 2C:
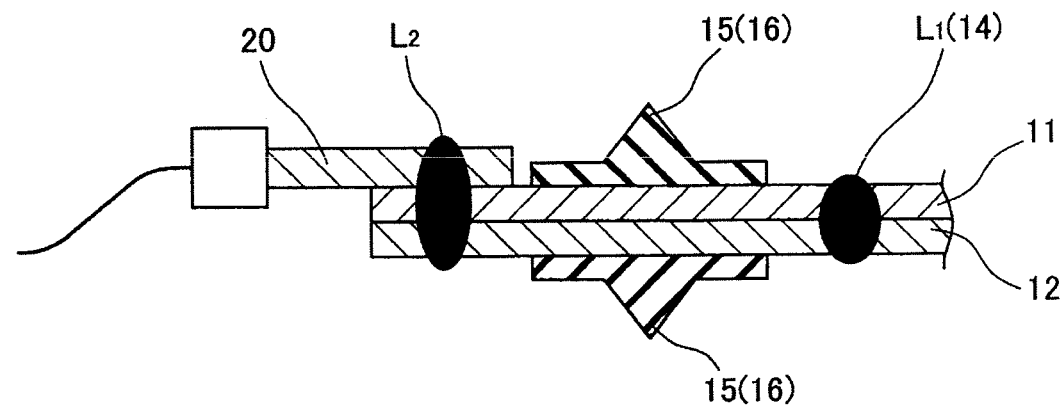

Subsequently, as illustrated in FIGS. 2(B) and 2(C), the accessory component 20 is stacked on the pair of welded separators 11 and 12, and then the separators 11 and 12 and the accessory component 20 are irradiated with a laser beam (second irradiation) to form the welded portion $L_2$ of the accessory component 20. When the separators 11 and 12 and the accessory component 20 are welded, the welded portion $L_2$ of the accessory component 20 is reciprocatingly irradiated with laser along a fixed welding line. Herein, the description "the welded portion $L_2$ of the accessory component 20 is reciprocatingly irradiated with laser along a fixed welding line" means that the irradiation is performed twice (one reciprocation) along the fixed welding line. However, when the start end and the termination end of the irradiation are set at the same position while overlapping each other on the plane, a state where the density of the energy to be emitted becomes excessively high is caused, so that a defect, such as a hole, occurs in some cases as described above.

Thus, in this example of the present invention, when the laser beam is emitted a plurality of times along the fixed welding line, the irradiation positions of the ends of the irradiation are shifted away from each other so that the irradiation energy can be dispersed. Specifically, when the laser beam is reciprocatingly emitted along the fixed welding line, the irradiation positions of the start end and the termination end of the irradiation are shifted away from each other so that the irradiation energy can be dispersed. A specific procedure is as follows.

First Scanning of Second Irradiation (Forward Scanning, FIG. 2(B))

Figure 3A:
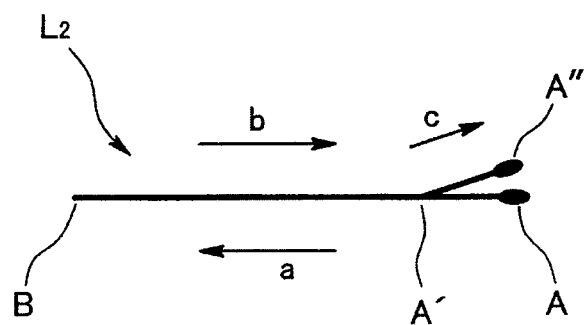
FIGS. 3(A) and 3(B) are explanatory views of laser irradiation positions in the laser welding method.

As illustrated in FIG. 3(A), when laser is emitted along the fixed welding line from an A point to a B point in the welded portion $L_2$ of the accessory component 20, the laser is emitted from the A point to the B point (arrow a) with the A point as the start end of the irradiation.

Second Scanning of Second Irradiation (Return Scanning, FIG. 2(C))

As illustrated in the figure, the laser is continuously emitted from the B point to the A point by returning at the B point (arrow b). However, the direction of the irradiation is changed at an A' point (branched portion) before (immediately before) reaching the A point, whereby a branched line of the welding line is set (arrow c) and an A" point close to the A point but different from the A point is set as the termination end of the irradiation.

Hence, according to this procedure, the welded portion $L_2$ of the accessory component 20 can be reciprocatingly irradiated with laser along the fixed welding line and the irradiation energy is dispersed by shifting the irradiation positions of the start end (A point) and the termination end (A" point) of the irradiation when the laser beam is reciprocatingly emitted along the fixed welding line, and therefore a state where the irradiation energy density becomes excessively high in the start end and the termination end of the irradiation is not caused. Hence, the occurrence of a defect, such as a hole, in a workpiece due to the fact that a state where the irradiation energy density becomes excessively high by a plurality of times of laser irradiation is caused can be prevented as expected by the present invention.

Figure 3B:
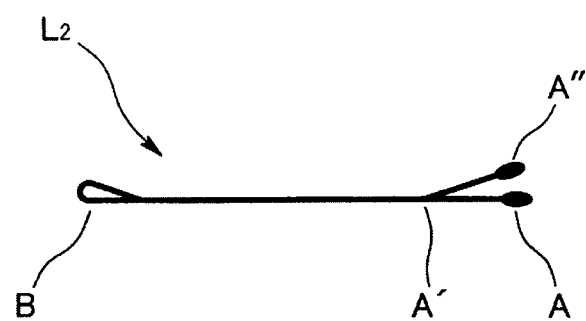

When there is a concern that the irradiation energy density increases not only in the start end and the termination end of the irradiation but at a returning portion (B point) of the irradiation, the welding line may be reversed in a U shape or a substantially U shape at the returning portion (B point) of the irradiation as illustrated in FIG. 3(B).

Moreover, it is also assumed that a laser beam is emitted a plurality of times in the same direction along the fixed welding line instead of reciprocatingly emitting a laser beam along the fixed welding line as with the example described above. Therefore, in this case, the irradiation positions of the start ends or/and the termination ends of the irradiation are shifted away from each other so that the irradiation energy can be dispersed. A specific procedure is as follows.

First Scanning of Second Irradiation

Figure 4:
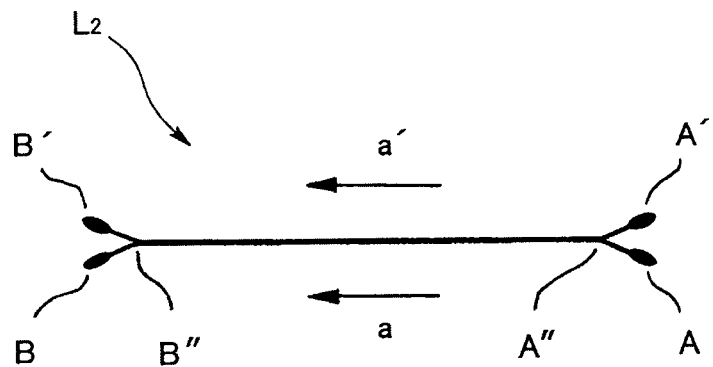
FIG. 4 is an explanatory view of laser irradiation positions in a laser welding method according to another example of the present invention.
Figure 5:
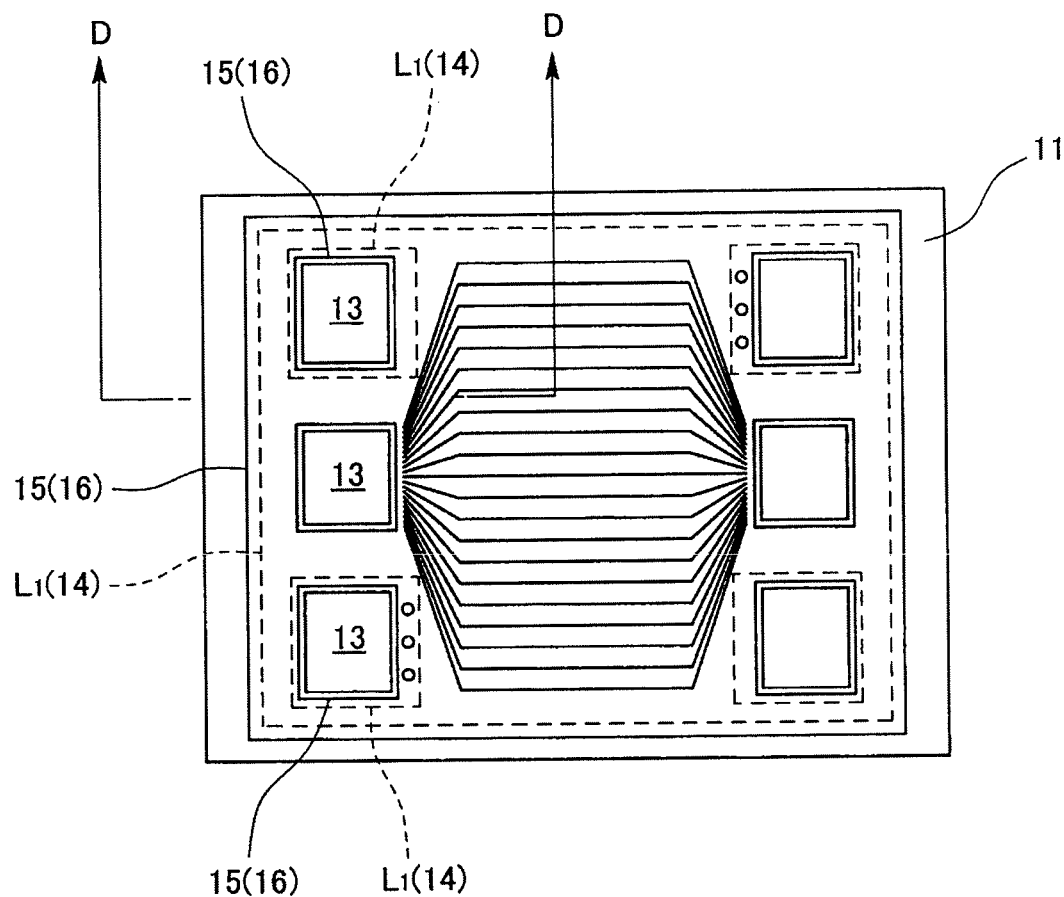
FIG. 5 is a plan view illustrating an example of a fuel-cell cell serving as a workpiece in a laser welding method according to a conventional example.
Figure 6:
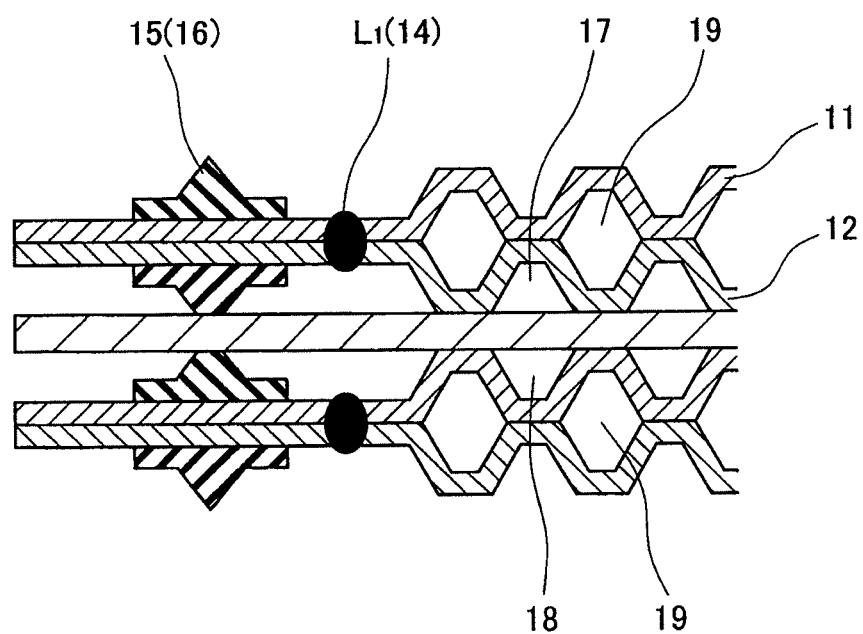
FIG. 6 is a cross-sectional view of a principal portion of the fuel-cell cell and is an enlarged cross-sectional view along the D-D line in FIG. 5.
Figure 7:
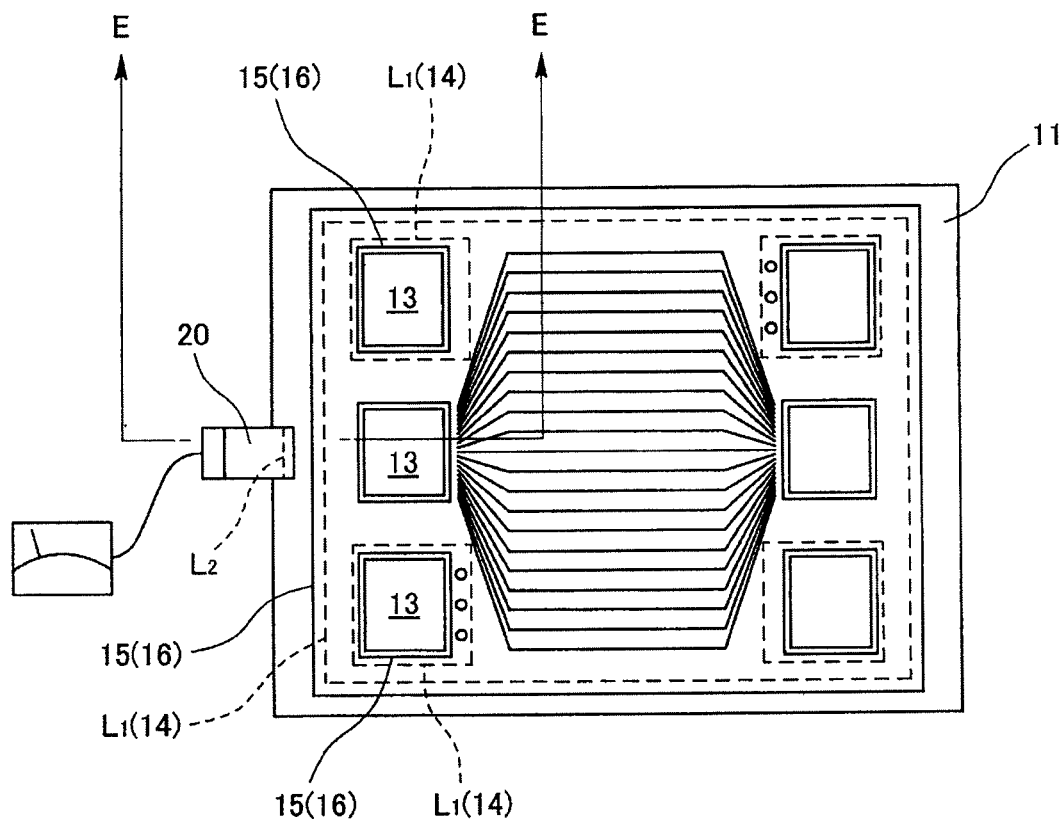
FIG. 7 is a plan view illustrating an example of a fuel cell constituent component serving as a workpiece in a laser welding method according to a conventional example.
Figure 8:
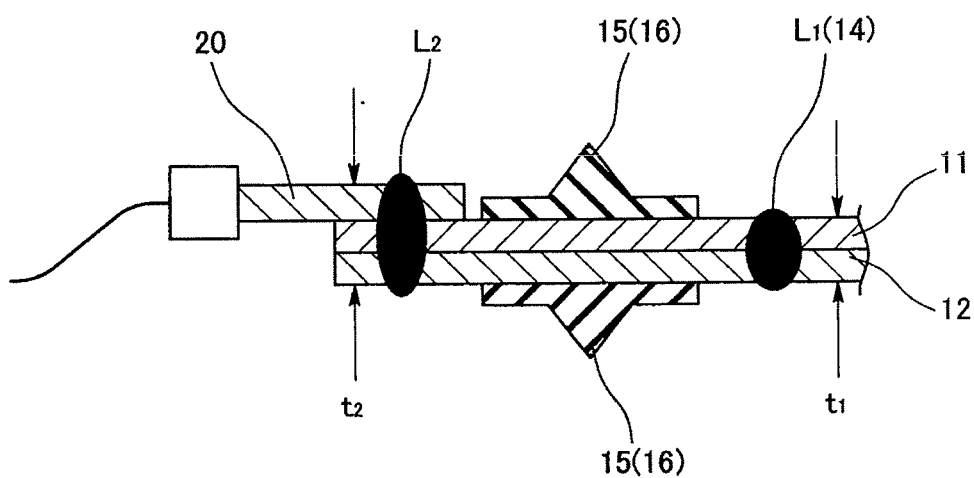
FIG. 8 is a cross-sectional view of a principal portion of the fuel cell constituent component and is an enlarged cross-sectional view along the E-E line in FIG. 7.

As illustrated in FIG. 4, when laser is emitted along the fixed welding line in the welded portion $L_2$ of the accessory component 20, the A point is set as the start end of the irradiation and the B point is set as the termination end of the irradiation (arrow a).

Second Scanning of Second Irradiation

The second scanning is continuously performed as illustrated in the figure. At this time, an A' point close to the A point but different from the A point is set as the start end of the irradiation and a B' point close to the B point but different from the B point is set as the termination end of the irradiation (arrow a'). The irradiation line of the first scanning and the irradiation line of the second scanning overlap each other on and after an A" point close to the A point and the A' point but different from the A point and the A' point and are branched on and after a B" point close to the B point and the B' point but different from the B point and the B' point.

Therefore, according to this procedure, the welded portion $L_2$ of the accessory component 20 can be irradiated with laser a plurality of times along the fixed welding line and, when the laser beam is emitted a plurality of times along the fixed welding line, the irradiation energy is dispersed by shifting the irradiation positions of the start ends (A point and A' point) and the termination ends (B point and B' point) of the irradiation from each other, and therefore a state where the irradiation energy density becomes excessively high in the start ends and the termination ends of the irradiation is not caused. Therefore, the occurrence of a defect, such as a hole, in a workpiece due to the fact that a state where the irradiation energy density becomes excessively high by a plurality of times of laser irradiation is caused can be prevented as expected the present invention.

DESCRIPTION OF REFERENCE NUMERALS

11,12 separator (first and second workpieces)
13 manifold
14 welded seal
15 gasket
16 rubber seal
17 hydrogen flow passage
18 oxygen flow passage
19 cooling water flow passage
20 accessory component (third workpiece)
$L_1$ separator welded portion
$L_2$ accessory component welded portion

The invention claimed is:

1. A laser welding method, comprising:
welding a plurality of workpieces by irradiating the workpieces in a stacked state with a laser beam,
wherein the welding comprises
performing a first irradiation by emitting the laser beam along a fixed welding line so as to weld a first workpiece and a second workpiece, and performing a second irradiation by reciprocatingly emitting the laser beam along a fixed welding line in performing the second irradiation so as to weld a third workpiece to the first and the second workpiece welded by the first irradiation, in a same process using a same irradiation device, and
during the second irradiation, shifting irradiation positions of a start end and a termination end of the irradiation away from each other so as to disperse irradiation energy.

2. A laser welding method, comprising:
welding a plurality of workpieces by irradiating the workpieces in a stacked state with a laser beam,
wherein the welding comprises
performing a first irradiation by emitting the laser beam along a fixed welding line so as to weld a first workpiece and a second workpiece, and performing a second irradiation by emitting the laser beam a plurality of times in a same direction along a fixed welding line in performing the second irradiation so as to weld a third workpiece to the first and the second workpiece welded by the first irradiation, in a same process using a same irradiation device, and
during the second irradiation, shifting irradiation positions of start ends or/and termination ends of the irradiation away from each other so as to disperse irradiation energy.

3. The laser welding method according to claim 1, wherein: the first and second workpieces are fuel cell separators, and the third workpiece is an accessory component attached to the fuel cell separator.

4. The laser welding method according to claim 2, wherein:
the first and second workpieces are fuel cell separators, and the third workpiece is an accessory component attached to the fuel cell separator.

* * * * *